Aug. 8, 1961    H. L. BOEWE ET AL    2,995,249
OIL FILTERS
Filed Dec. 2, 1957    2 Sheets-Sheet 1
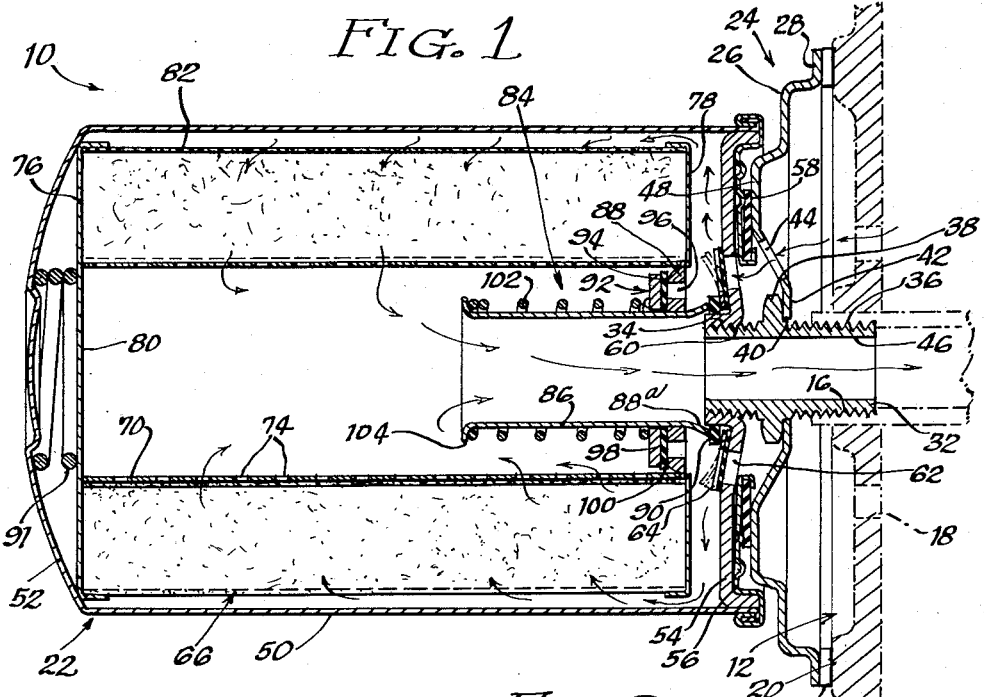
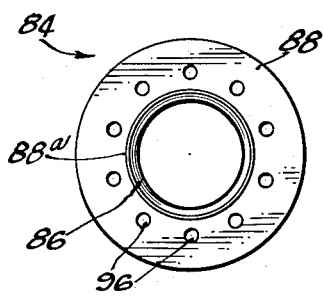
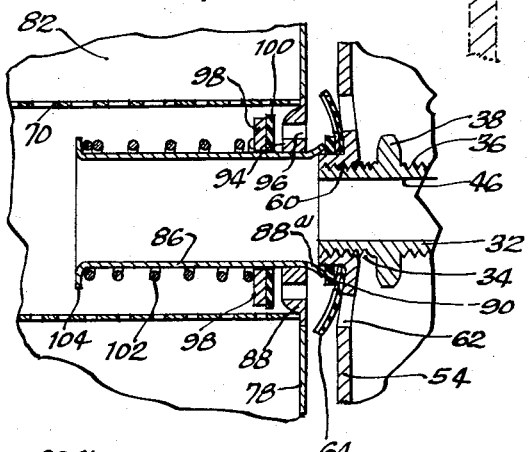
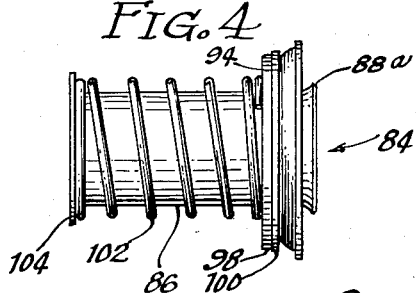
INVENTORS
Howard L. Boewe
Howard H. Gaither
BY
Ooms, McDougall, Williams & Hersh
Attorneys

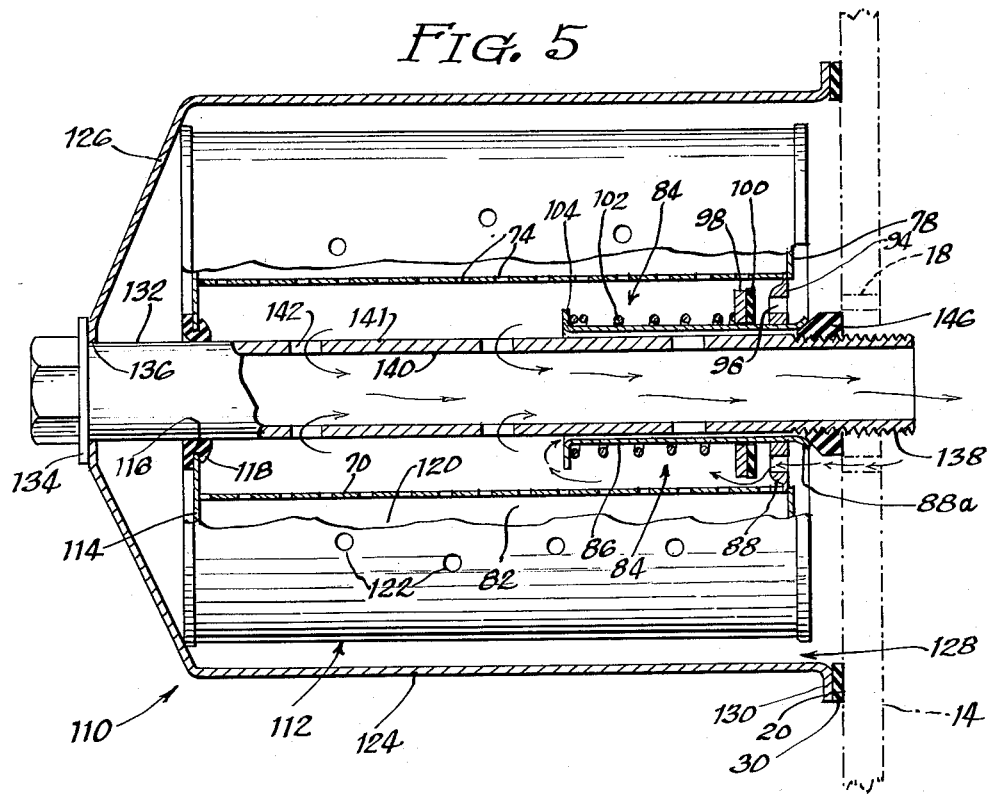

United States Patent Office 2,995,249
Patented Aug. 8, 1961

2,995,249
OIL FILTERS
Howard L. Boewe and Howard H. Gaither, West Salem, Ill., assignors, by mesne assignments, to Champion Laboratories, Inc., West Salem, Ill., a corporation of Connecticut
Filed Dec. 2, 1957, Ser. No. 700,025
7 Claims. (Cl. 210—130)

This invention relates to oil filters, particularly of the type which may be employed to filter the engine oil of an automotive engine or the like.

One object of the present invention is to provide a new and improved oil filter which has a bypass valve adapted to bypass oil directly between the inlet and the outlet of the oil filter, in the event that the filter element should become clogged, and which is arranged so that the oil, in passing through the bypass valve, will not wash foreign material from the clogged filter element.

A further object is to provide new and improved oil filter arrangements of the foregoing character, in which the filter element may either be in the form of a replacement cartridge, or may be incorporated in a throw-away filter unit.

Another object is to provide oil filters of the foregoing character which are effective and reliable, yet easy to manufacture and low in cost.

Further objects and advantages of the present invention will appear from the following description, taken with the accompanying drawings, in which:

FIG. 1 is a longitudinal sectional view showing an oil filter to be described as an illustrative embodiment of the present invention, the filter being of the throw-away type.

FIG. 2 is a fragmentary sectional view, similar to a portion of FIG. 1, but showing the bypass valve in its open position;

FIGS. 3 and 4 are front and side elevational views of the bypass valve;

FIG. 5 is a longitudinal sectional view of a modified oil filter which is similar to the filter of FIGS. 1–4, but is of the replacement cartridge type.

As already indicated, FIGS. 1–4 illustrate an oil filter 10 which has many applications, but is particularly well adapted for filtering the engine oil of an automotive engine. The manner in which the filter 10 may be connected to the automotive engine may be varied considerably. In the illustrated arrangement, however, the oil filter 10 is adapted to be mounted against a surface 12 of the engine block 14. It will be seen that the block 14 has an internally threaded opening 16 adapted to receive oil from the filter 10. The oil passes out of the block through one or more ports or openings 18 disposed around the opening 16. In this case, the block has a flat, annular seat 20 around the openings 16 and 18, for use in sealing the filter in engagement with the block against the escape of oil.

The illustrated filter 10 is of the throw-away type, and thus comprises a throw-away unit 22. An adaptor 24 may be provided to assist in mounting the unit 22 on the block 14. In this case, the adaptor 24 comprises a dished plate 26, somewhat similar to a saucer in shape. Thus, the adaptor plate 26 has an outside flange 28 which projects inwardly or to the right, as seen in FIG. 1, so as to be adapted to seat against the flat annular surface 20 with a gasket 30 therebetween.

The adaptor 24 also comprises a nipple or bushing 32 having externally threaded end portions 34 and 36, with an outwardly projecting head or flange 38 therebetween. It will be seen that the right hand threaded portion 36 is adapted to extend through a central opening 40 in the adaptor plate 26. Moreover, it will be apparent from FIG. 1 that the right hand threaded portion 36 is adapted to be screwed into the internally threaded opening 16 provided in the engine block 14. The flange 38 is preferably hexagonal or of some other non-circular shape, so that it may be turned with a wrench to clamp the adaptor plate 26 against the engine block 14. In order to receive the head or flange 38, the adaptor plate 26 has a recessed central portion 42.

The oil passes to the throw-away filter unit 22 through one or more ports 44 which extend through the adaptor plate 26 at points spaced outwardly a short distance from the central opening 40. The oil passes out of the throw-away filter 22 through a bore 46 formed in the nipple 32.

The throw-away filter 22 is adapted to seat against an annular flat surface or seat 48 which is formed outwardly or to the left on the adaptor plate 26. The seat 48 is spaced outwardly from the ports 44.

It will be seen that the throw-away filter unit 22 comprises a generally cylindrical housing 50 having outer and inner end walls 52 and 54, at the left and right hand ends of the housing as seen in FIG. 1. In this case, the cylindrical housing 50 and the left hand end wall 52 are formed in one piece, while the end wall 54 is crimped or otherwise secured to the housing 50. An annular retainer plate 56 is employed to mount an annular gasket 58 on the inner end 54 of the housing 50. It will be seen that the gasket 58 is adapted to seat against the flat annular surface 48 on the adaptor plate 26.

The illustrated housing 50 has an internally threaded outlet opening 60 which is formed centrally in the end wall 54. One or more inlet ports 62 are also formed in the end wall 54 and, preferably, are spaced outwardly a short distance from the outlet opening 60. In this case, the inlet ports 62 are arranged in a circle around the outlet opening 60.

While not necessary to the present invention, the illustrated filter 22 is provided with reed check valves 64 which normally extend over the inner ends of the inlet ports 62 just inside of the end wall 54. The check valve 64 readily opens, as shown in FIG. 2 to admit oil to the housing 50, but is effective to prevent backflow of oil through the inlet ports 62.

Within the housing 50, the throw-away filter 22 is provided with a filter element or cartridge 66 which is annular and generally cylindrical in form. It will be seen that the filter cartridge 66 has an inner cylindrical core or tube 70 which is formed with numerous openings 74 for passage of oil out of the cartridge 66. Outer and inner end walls 76 and 78 are connected to the ends of the tube 70 at the left and right hand ends of the cartridge 66. In this case, the left hand or outer end wall 76 has a central portion 80 which closes the outer end of the tube 70. On the other hand, the right hand end wall 78 is centrally apertured and thus leaves an opening in the right hand end of the tube 70.

Suitable filtering material 82 is mounted in the space between the end walls 76 and 78, around the core 70. The filtering material 82 may be of any known or suitable type, such as the illustrated pleated filter paper or cardboard, cotton fibers, or the like. The filtering material 82 may be cemented or otherwise secured to the end walls 76 and 78.

Normally, the oil to be filtered enters the housing 50 through the inlet ports 62 and is supplied to the outside of the cartridge 66. The oil passes through the filtering material 82 and then into the inner shell 70. The outflow of oil is through the outlet opening 60.

At the inner or right hand end of the inner shell 70, the illustrated filter unit 22 is provided with a combined bypass valve and outlet unit 84. Thus, the unit 84 comprises an outlet conduit or tube 86 which is of smaller diameter than the tube 70 and is coaxial therewith. The outlet sleeve or conduit 86 is mounted in and extends through a disc 88 which is seated in the inner or right hand end of the inner shell 70, so as to prevent oil from entering or leaving the inner shell 70 except through the outlet conduit 86. At its inner end, the outlet conduit 86 has a slightly flared portion 88a which is adapted to seat around the outlet opening 60 in the end wall 54. A gasket or sealing ring 90 is employed to prevent oil from leaking between the end of the conduit 86 and the end wall 54. It will be seen that a coil spring 91 is compressed between the end wall 52 and the cartridge 66 to hold the outlet conduit 86 against the gasket 90.

As already indicated, the unit 84 also includes a bypass valve 92. Thus, the disc 88 is formed with an annular valve seat 94 which faces into the inner shell 70. One or more valve ports 96 extend through the disc 88. It will be seen that the valve ports 96 are closely adjacent the inlet ports 62.

The valve ports 96 are adapted to be closed by an annular valve member 98 which is received around the outlet conduit 86 and is movable into and out of engagement with the valve seat 94. In this case, the valve member 98 has a soft facing 100 to insure that the member will make a perfect seal with the valve seat 94.

A spring 102 is employed to bias the valve member 98 against the valve seat 94, so that the valve member will not open under normal conditions. In this case the spring 102 is coiled around the outlet conduit 86 and is compressed between the valve member 98 and the flange 104 at the inner end of the conduit 86.

Normally the oil flows into the unit 22 through the inlet ports 62 and thus is supplied to the outside of the filter cartridge 66. The oil passes through the filtering material 82 and the inner shell 70. Then, the filtered oil passes out of the unit 22 through the conduit 86 and the outlet opening 60.

In the event that the filtering material 82 should become clogged, the oil pressure will build up at the inlet ports 62 to such an extent that the valve member 98 will be unseated. Then, the oil will be bypassed directly from the inlet ports 62 through the valve ports 96, and thence to the inside of the tube 70. The bypassed oil will pass out of the inner shell 70 through the outlet conduit 86. The open position of the bypass valve member 98 is shown in FIG. 2.

Since the valve ports 96 are immediately adjacent the inlet ports 62, there will be no tendency for the bypassed oil to wash dirt or other foreign matter from the filter cartridge 66. This difficulty has been experienced with previous bypass arrangements, but is completely avoided by the present arrangement. The bypassed oil does not come into contact with the outer portion of the filter cartridge 66, which is likely to be covered with an accumulation of foreign matter.

FIG. 5 illustrates a modified oil filter 110, which is much the same as the filter of FIGS. 1-4, but is arranged to employ a replacement filter cartridge 112. In most respects, the replacement cartridge 112 is the same as the cartridge 66. Thus, corresponding parts of the two cartridges have been given the same reference characters. Only the differences need be described. Thus, the replacement cartridge 112 has a left-hand end wall 114 which has a central opening 116. A sealing ring or grommet 118 is mounted within the opening 116, for a purpose to be described shortly. An outer shell or can 120 is secured between the end walls 110 and 78, to encase the filtering material 82. Apertures 122 are formed in the outer shell 120 to admit oil.

The combination bypass valve and outlet unit 84 is mounted in the right-hand end of the inner shell or core 70, substantially the same as in FIGS. 1-4.

In the arrangement of FIG. 5, the replacement cartridge is adapted to be mounted within a permanently usable, generally cylindrical housing 124 having an open right or inner end, and a closed left or outer end wall 126. Thus, the housing has a right-hand opening 128 which serves as an inlet opening for the oil. At its right-hand end, the housing 124 has a flange 130 adapted to seat against the annular seat 20 on the engine block 14, with the gasket 30 therebetween.

The housing 124 is adapted to be clamped against the engine block 14 by means of a shaft or stem 132 which is closed at its outer end and is formed with a head or flange 134 adapted to seat against the left-hand end wall 126. The shaft 132 extends through a central opening 136 in the end wall 126. At its inner or right hand end, the shaft 132 has an externally threaded portion 138 adapted to be screwed into the threaded opening 16 formed in the block 14. It will be seen that the major portion of the shaft 132, at the right hand end thereof, is tubular and thus has an axial bore 140 therein. The tubular right hand portion of the shaft 132 is designated 141. One or more radial openings 142 are formed in the tubular portion 141 so that filtered oil may pass into the bore 140 and thence out of the filter 110.

As already indicated, the combination bypass valve and outlet unit 84 is the same as in FIGS. 1-4 and is seated within the right hand end of the inner shell 70. A sealing ring or gasket 146 is mounted around the right hand end of the shaft 132 to make a seal with the flared end portion 88a of the outlet conduit 86. Thus, the sealing ring 146 is adapted to be clamped between the outlet conduit 86 and the block 14.

Normally, the oil to be filtered flows into the housing 124 through the open right hand end 128 and thus is supplied to the outside of the cartridge 112. The oil passes through the cartridge, into the inner shell 70, and thence through the ports 142 into the tubular portion 141 of the shaft 132. The tubular portion 141 carries off the oil into the engine block 14.

If the cartridge 112 should become clogged, the inlet pressure opens the bypass valve member 98, whereupon the oil is bypassed through the valve ports 96 directly between the inlet opening 128 and the inside of the tube 70. Here again, there is no tendency for the bypassed oil to wash dirt or other foreign matter from the filter cartridge 112. The bypassed oil does not come into contact with the outside of the filter cartridge.

The cartridge 112 is replaced by unscrewing the shaft 132, whereupon the housing 124 may be removed from the block 14. The expended cartridge may be slipped off the shaft 132, whereupon a new cartridge may be slipped on the shaft. The old bypass valve is discarded with the cartridge. The grommet or ring 118 forms a seal with the left-hand portion of the shaft. Next, the sealing ring 146 is replaced. Usually a new sealing ring 146 will be employed, along with the new gasket 30. The shaft 132 is then screwed into the block to clamp the housing 124 against the block.

It will be apparent that the illustrated filter provides an effective bypassing action, without any tendency for the bypassed oil to wash dirt from the filter cartridge. At the same time, the illustrated filters are easy to manufacture and low in cost. The bypass valve is part of the filter element and thus does not add to the original cost of the engine, unless a filter is provided.

Various modifications, alternative constructions and equivalents may be employed without departing from the true spirit and scope of the invention, as exemplified in the foregoing description and defined in the following claims.

We claim:

1. An oil filter having a casing with inlet ports and an outlet port at one end thereof and a generally tubular filter disposed within the casing for filtering oil as it is circulated therethrough, said tubular filter comprising a tubular core having openings therein, a bypass valve unit disposed within said core and comprising a ported valve disc mounted in the filter disposed substantially flush with said one end thereof, a sleeve member secured in and by the disc and extending axially into the core with an annular space between the sleeve member and the inner annular surface of the core, and a valve member in said space encircling the sleeve member, spring biased against the ported valve disc to normally maintain the said ports closed, said sleeve member being in axial alignment with the outlet port of said casing.

2. An oil filter having a casing with inlet and outlet ports and a generally tubular filter disposed within the casing for filtering oil as it is circulated therethrough, a bypass valve unit comprising a ported valve disc mounted in the filter substantially flush with one end thereof, a sleeve member secured in and by the disc to project axially into the filter with an annular space between the sleeve member and the inner surface of the filter, and a valve member encircling the sleeve member and spring biased against the valve disc to normally maintain the same closed, said sleeve member extending inwardly beyond the disc for sealing engagement against one end wall of the casing and in axial alignment with an outlet port thereof, a sealing ring supported on said casing wall around said outlet in sealing connection with the said inward extending end of said sleeve member and resilient means urging the filter toward said end wall to maintain said sealing engagement of the sleeve member therewith.

3. An annular full flow filter comprising a cylindrical housing adapted to be mounted against the surface of an engine block, said housing having the front wall thereof formed with fluid inlet and outlet means, a filter cartridge insertable in said housing, said filter cartridge having a central bore defined by a tubular filter core, said cartridge having a front valved end and a closed rear end, said rear end being closed by an end wall extending across the end of said central bore and said valved front end of the cartridge having an apertured end wall with said aperture in alignment with the open front end of the bore, an outlet conduit having a bore in concentric alignment with the said outlet means in the front wall of said housing, said conduit being in fluid tight connection at the outlet extremity thereof with respect to the front interior surface of the front wall of said housing around said housing outlet means and concentrically extending from within the front end of said cartridge bore rearwardly into a portion of the central bore of said filter cartridge, a bypass valve mounted around said outlet conduit in the front end of the said filter cartridge bore on the front end of said outlet conduit, said bypass valve comprising a ported disk fixed on the front end of said outlet conduit, and a movable disk on said outlet conduit opposed to said disk and provided with a soft valve facing, and a spring encircling said outlet conduit and reacting on said movable disk, said bypass valve operating from closed to fluid bypassing open position in response to fluid pressures developed at the said housing inlet ports adjacent the front end of the said cartridge when the filter medium becomes clogged, whereby the fluid entering said inlet ports is bypassed at the front end of the cartridge by said bypass valve directly to said outlet conduit in the said cartridge bore and through said outlet means, thereby bypassing the rear portion of the filter medium in the rear end of the said housing.

4. An annular full flow filter cartridge comprising a cylindrical housing adapted to be mounted against the surface of an engine block, said housing having the front wall thereof formed with fluid inlet and outlet means, said filter cartridge having a central bore defined by an annular filter medium, said cartridge having a front valved end and a closed rear end, said rear end being closed by an end wall extending across the end of said central bore and said valved front end of the cartridge having an apertured end wall with said aperture in alignment with the open front end of the central bore, an outlet conduit smaller than the bore of said cartridge having a bore in concentric alignment with the said outlet means concentrically extending from the front end of said cartridge rearwardly into a portion of the central bore of said filter in the provision of an annular space, said outlet conduit having an outwardly flared rim portion, a sealing ring encircling said outlet means, said flared portion being adapted to seat on said ring around the outlet means for the front wall of said cylindrical housing and within an annular area defined by said valve fluid inlet openings of said housing, and an annular disc formed with a plurality of valve ports and a valve member normally biased against said disc, to thereby close said valve ports, said disc being mounted on said outlet conduit in said annular space adjacent said flared rim portion in the provision of a bypass valve, said valve operating from closed to fluid bypassing open position in response to fluid pressures developed at the said housing inlet ports adjacent the front end of the said cartridge when the filter medium becomes clogged, whereby the fluid entering said inlet ports is bypassed at the front end of the cartridge by said bypass valve directly into said outlet conduit and said outlet means, thereby bypassing the rear portion of the filter medium extending toward the rear end of the said housing.

5. An annular full flow filter comprising a cylindrical housing adapted to be mounted against the surface of an engine block, said housing having the front wall thereof formed with fluid inlet and outlet means, said filter cartridge having a central bore defined by an annular filter medium, said cartridge having a front valved end and a closed rear end, said rear end being closed by an end wall extending across the adjacent end of said central bore and said valved front end of the cartridge having an apertured end wall with said aperture in axial alignment with the open front end of the cartridge bore, an outlet conduit smaller than the bore of said cartridge having a bore in concentric alignment with the said outlet means extending from the front end of said cartridge rearwardly into a portion of the central bore of said filter, said outlet conduit having a rim portion, a sealing ring encircling said outlet means, said rim portion being adapted to seat on said ring around the outlet means in the front wall of said cylindrical housing and within an annular area defined by said valve fluid inlet openings of said housing, an annular disc surrounding said outlet conduit formed with a plurality of valve ports and a valve member normally biased against said disc in said annular space, to thereby close said valve ports, said disc being mounted on said outlet conduit adjacent said rim portion in the provision of a bypass valve, said valve operating from closed to fluid bypassing open position in response to fluid pressures developed at the said housing inlet ports adjacent the front end of the said cartridge when the filter medium becomes clogged, whereby the fluid entering said inlet ports is bypassed at the front end of the cartridge by said bypass valve directly to said outlet conduit and said outlet means, thereby bypassing the rearward portion of the filter medium extending toward the rear end of the said housing, said outlet conduit being formed with a flange at the end opposite to said rim portion, and a coiled spring on said outlet conduit compressed between said flange and said valve disc, to thereby retain said rim portion of said conduit seated on said sealing ring.

6. A bypass unit for disposable oil filter cartridges having a cylindrical filter means with a central perforate tube, said unit comprising a first disc formed with a central opening and with a plurality of relatively small surrounding openings, a second disc with a central opening opposed to said first disc, an outlet conduit of relatively smaller diameter than said tube having an end thereof fixed in the central opening of said first disc and extending through the said central opening in said second disc, said second disc being bodily movable longitudinally with respect to said first disc to close and open the said small openings in said first disc, said outlet conduit extending into the bore of the said relatively larger filter tube, a flange on the end thereof in the filter tube, and a spring coiled around said outlet conduit in the bore of said filter tube, said spring being comprissed between said flange and the said second disc, to thereby bias said second disc toward said first disc to normally close said openings therein and permit a bypass of oil feeding through said openings directly into said outlet conduit in response to oil pressure developed by a clogged filter medium.

7. An annular replaceable full flow filter, comprising a cylindrical housing having an open front end engageable with a surface of an engine block and which surface is provided with an oil outlet opening co-axial with said housing and a series of oil inlet openings surrounding the outlet opening, an elongated shaft having an axial bore and whose wall is provided with radial openings, one end of said shaft being threaded onto said central opening, said shaft extending through the rear end of said housing and having means for holding the front end of the housing in engagement with said engine wall, a cylindrical filter cartridge disposed within said housing in surrounding relation to said shaft, said cartridge having an outer wall provided with oil admission apertures, said cartridge having an inner cylindrical core provided with openings in communication with said openings in said shaft, and a bypass valve disposed at the front end of said filter cartridge and between same and said shaft, said valve comprising a sleeve member encircling said shaft, a disk fixed on the front end of said sleeve member and having valve openings and a cooperating valve member movably supported on said sleeve member and being yieldably urged toward said fixed valve disk.

References Cited in the file of this patent

UNITED STATES PATENTS

| | | |
|---|---|---|
| 2,188,745 | Wagner | Jan. 30, 1940 |
| 2,431,782 | Walton | Dec. 2, 1947 |
| 2,598,322 | Vokes | May 27, 1952 |
| 2,617,535 | Hamilton | Nov. 11, 1952 |
| 2,734,636 | Foster | Feb. 14, 1956 |
| 2,770,368 | Tischer | Nov. 13, 1956 |
| 2,884,133 | Walulik | Apr. 28, 1959 |